(No Model.)
A. KIGER.
Baling Clamp.
No. 239,173. Patented March 22, 1881.
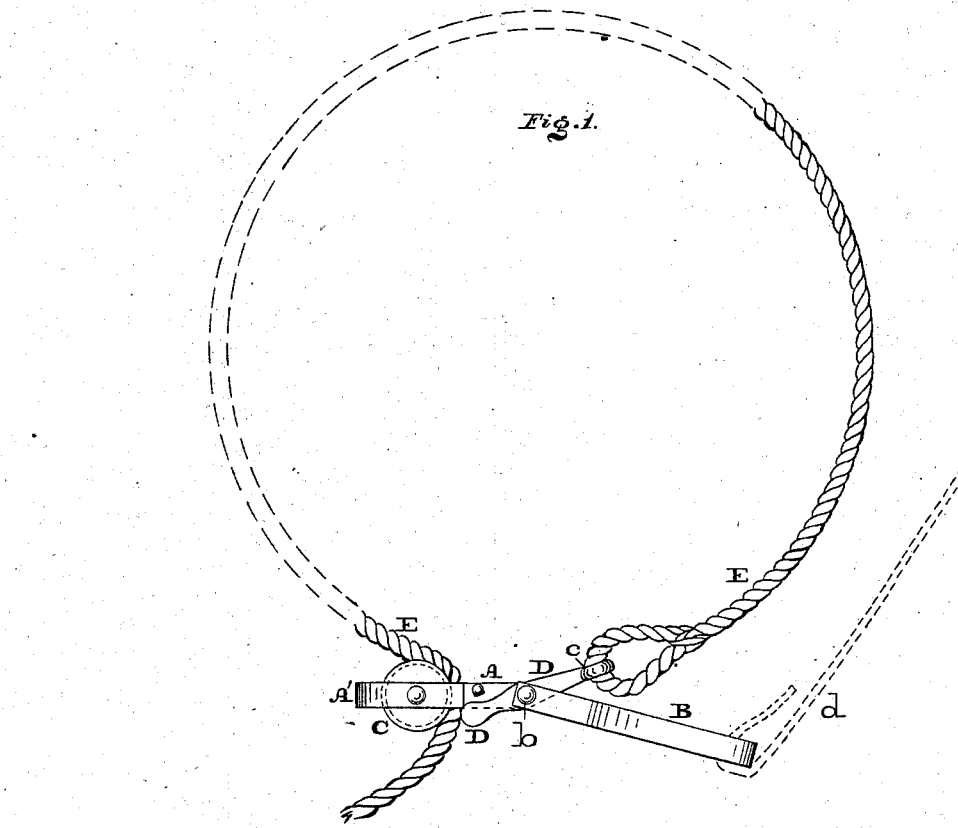
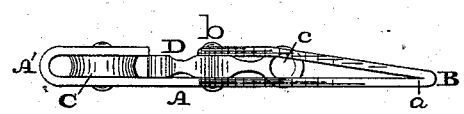
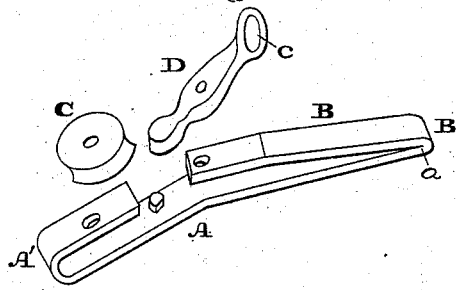
Witnesses:
A. P. Grant
W. A. Kircher
Inventor:
Alfred Kiger,
by John A. Wiederstein
ATTORNEY.

UNITED STATES PATENT OFFICE.

ALFRED KIGER, OF DARETOWN, NEW JERSEY.

BALING-CLAMP.

SPECIFICATION forming part of Letters Patent No. 239,173, dated March 22, 1881.

Application filed October 2, 1880. (No model.)

*To all whom it may concern:*

Be it known that I, ALFRED KIGER, a citizen of the United States, residing at Daretown, in the county of Salem, State of New Jersey, have invented a new and useful Improvement in Clamps for Baling or Bundling Fodder, Hay, &c., which improvement is fully set forth in the following specification and accompanying drawings, in which—

Figure 1 is a top or plan view of the baling-clamp embodying my invention. Fig. 2 is a front view thereof. Fig. 3 is a perspective view of the clamp, the parts being separated.

Similar letters of reference indicate corresponding parts in the several figures.

Heretofore, in forming large bundles or bales of cornstalks and other fodder by hand, owing to the inconvenience of the operation thereof, two persons are required for tightly tying the binding-cord.

My invention consists of a clamp with an attached rope or cord, which may be tightened and held around the bundle or bale as a temporary binder, and having means for temporarily holding the binding-cord proper at one end while the length thereof is run around the bundle or bale, thus providing a device which may be conveniently operated by one person.

Referring to the drawings, A represents a metallic stock, which is formed at one end with a hook, A', and at the other end with an arm, B, the inner angle, $a$, whereof is acute. The arm B is formed by turning back a portion of the stock. The stock and arm portion are brought close together at the bend, so that the inner angle thereof is sharp or acute, to form a bight, for the purposes hereinafter set forth.

C represents a roller, pulley, or bearing mounted on the hook portion A', between the side pieces thereof; and D represents a clamping-lever, having its axis $b$ connected to the stock A and inner termination of the arm B, the inner end of the lever projecting toward the pulley C, and being adjacent thereto when in operative position, and its other end having an eye, $c$, for the attachment of a rope, E, as a fixture of the device.

The operation is as follows: The rope E is slipped around the gathered fodder, &c., or bundle or bale, and then placed on the periphery of the roller or pulley, as shown in Fig. 1, it being noticed that the eye end of the lever D is on the inside or contiguous to the bundle or bale. By drawing out the free end of the rope the length of the rope is tightened around the bundle or bale, and when the required compression is obtained the rope is let go, and the head of the lever presses or clamps the rope against the pulley and holds it in a secure and reliable manner, so that the bundle or band cannot open. The binding-cord $d$, shown in dotted lines, is now to be applied. This is accomplished by inserting one end of the same through the arm B from the front, at the angle $a$ thereof, and then running the cord backward and around the bundle or bale.

It will be noticed that owing to the bight of the arm B on the end of the binding-cord said end is prevented from slipping and securely held. When the cord is brought around to the front the attached end thereof is released from the arm B, after which the cord is tightened, and its two ends are tied, the permanent fastening of the bundle or bale thus being produced. A blow or two is imparted to the arm B, whereby, owing to the jar incident to the blow or blows, the lever D is tripped or disengaged from the rope E, and the latter, loosening its hold on the bundle or bale, may be entirely removed with the stock, &c., the device being in condition to be applied to other portions of the bundle or bale and other bundles or bales.

Having thus described my invention, what I claim as new, and desire to secure by Letters Patent, is—

1. The stock A, with roller or bearing C, in combination with the clamping-lever D, having an attached rope, E, substantially as and for the purpose set forth.

2. The stock A, having the arm B, with a bight, $a$, in combination with the roller or bearing C and lever D, substantially as and for the purpose set forth.

ALFRED KIGER.

Witnesses:
E. J. SNYDER,
A. P. GRANT.